Aug. 4, 1936.   J. R. PEIRCE ET AL   2,049,719
PERFORATED CARD READING AND ANALYZING DEVICE
Filed Dec. 16, 1932   4 Sheets-Sheet 3
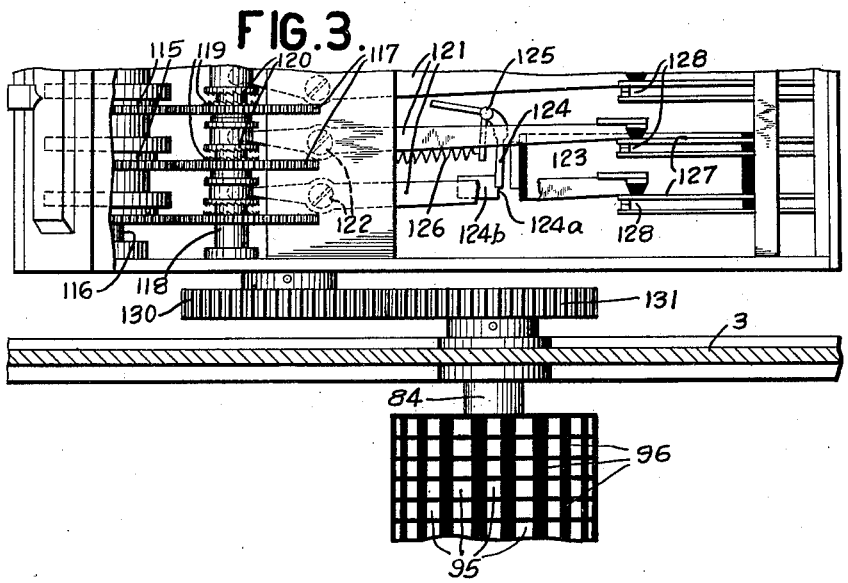
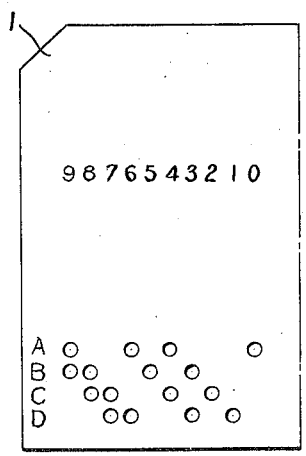
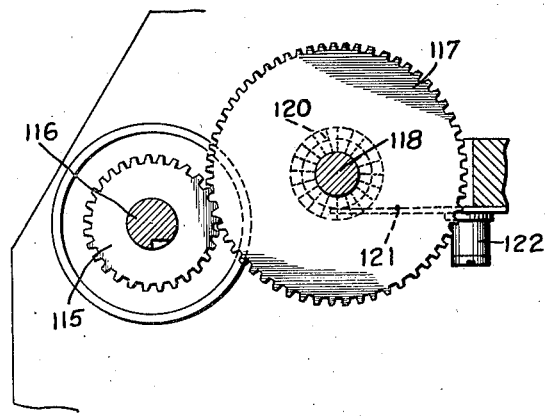

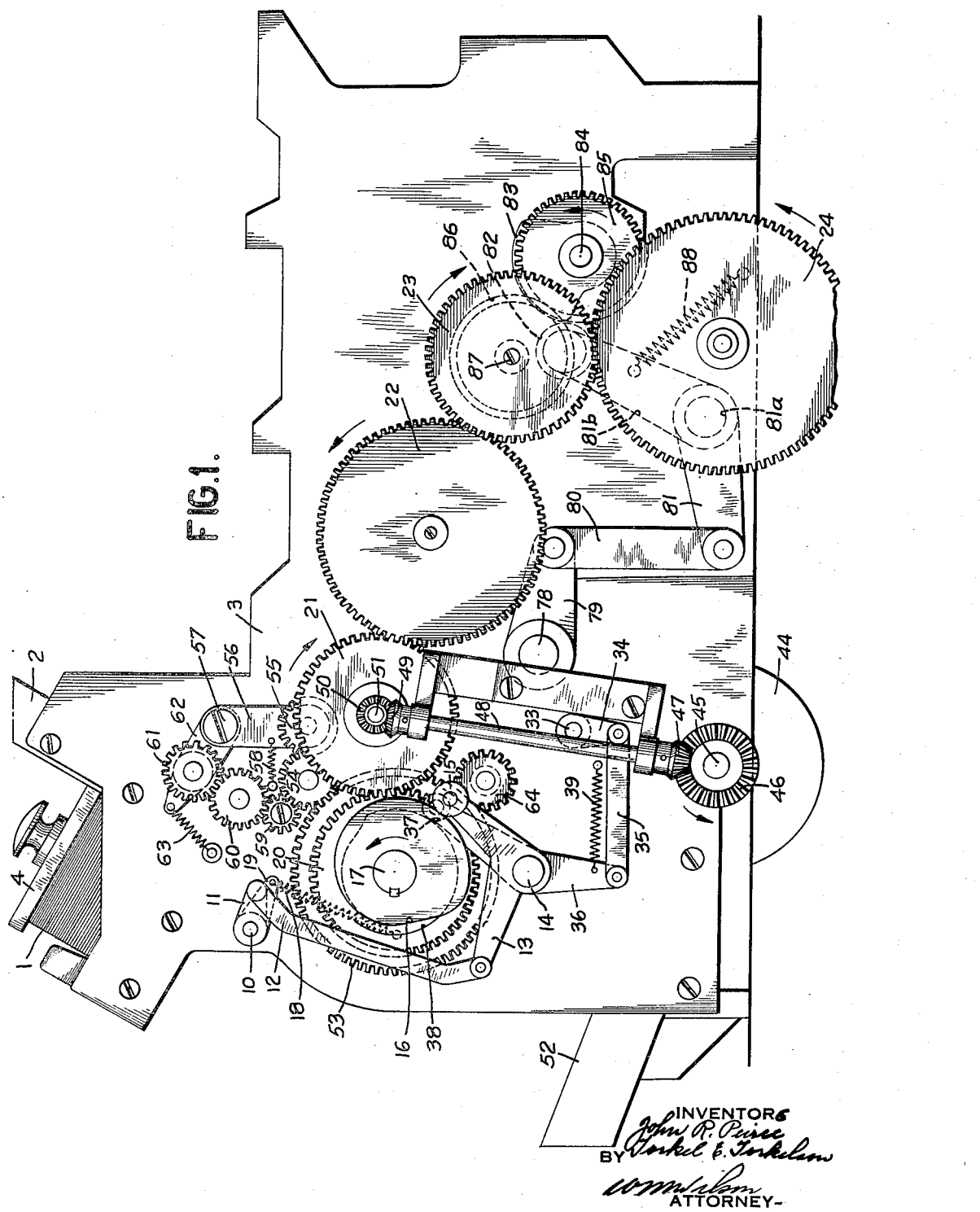

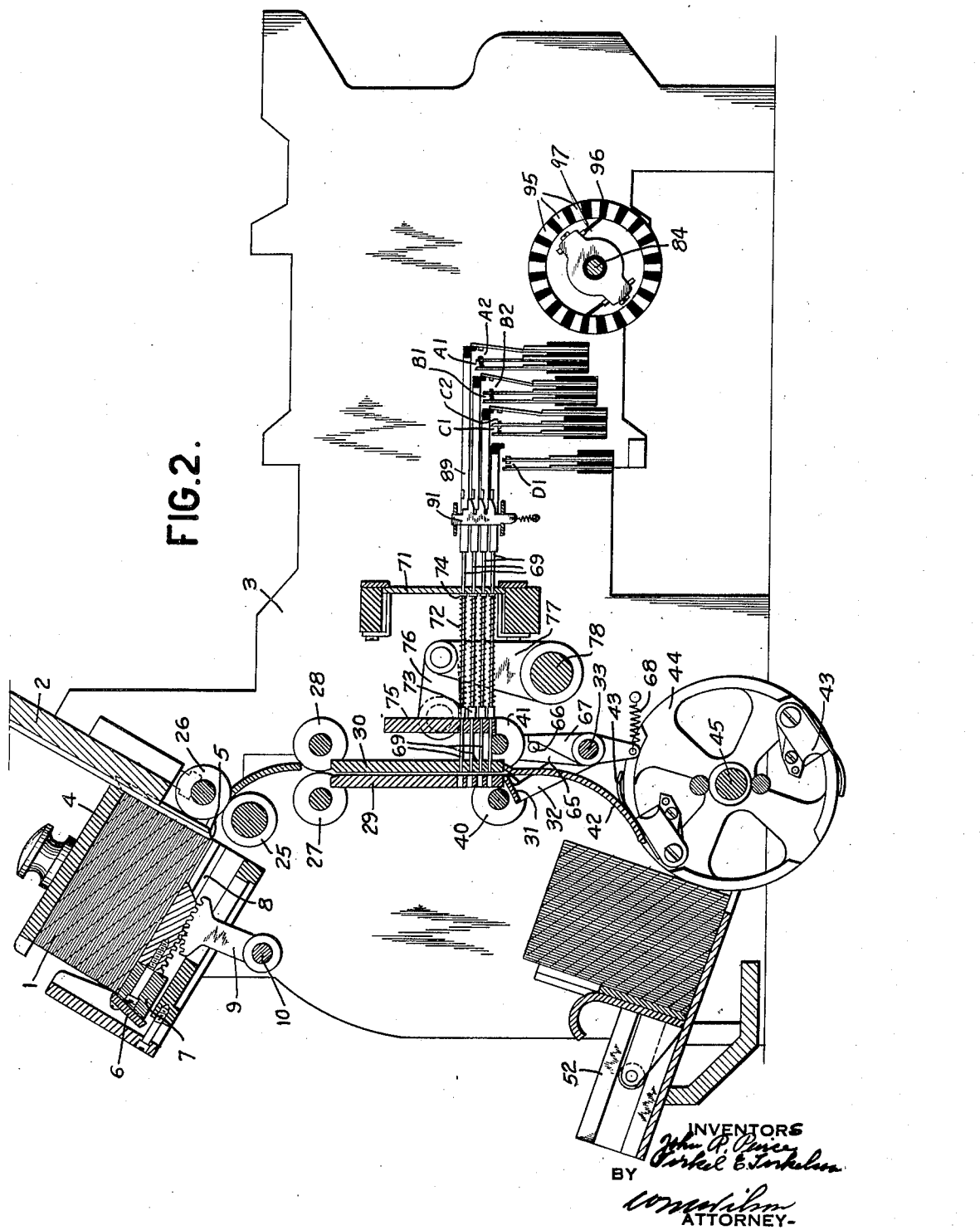

Aug. 4, 1936. J. R. PEIRCE ET AL 2,049,719
PERFORATED CARD READING AND ANALYZING DEVICE
Filed Dec. 16, 1932 4 Sheets-Sheet 4
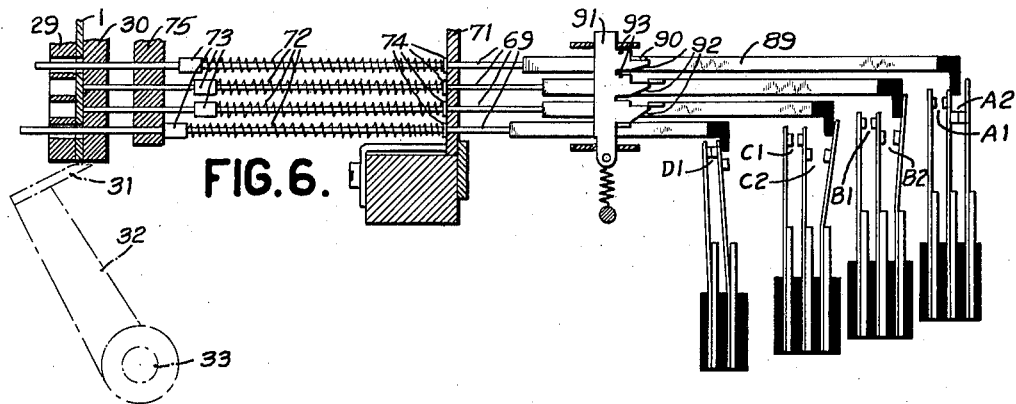
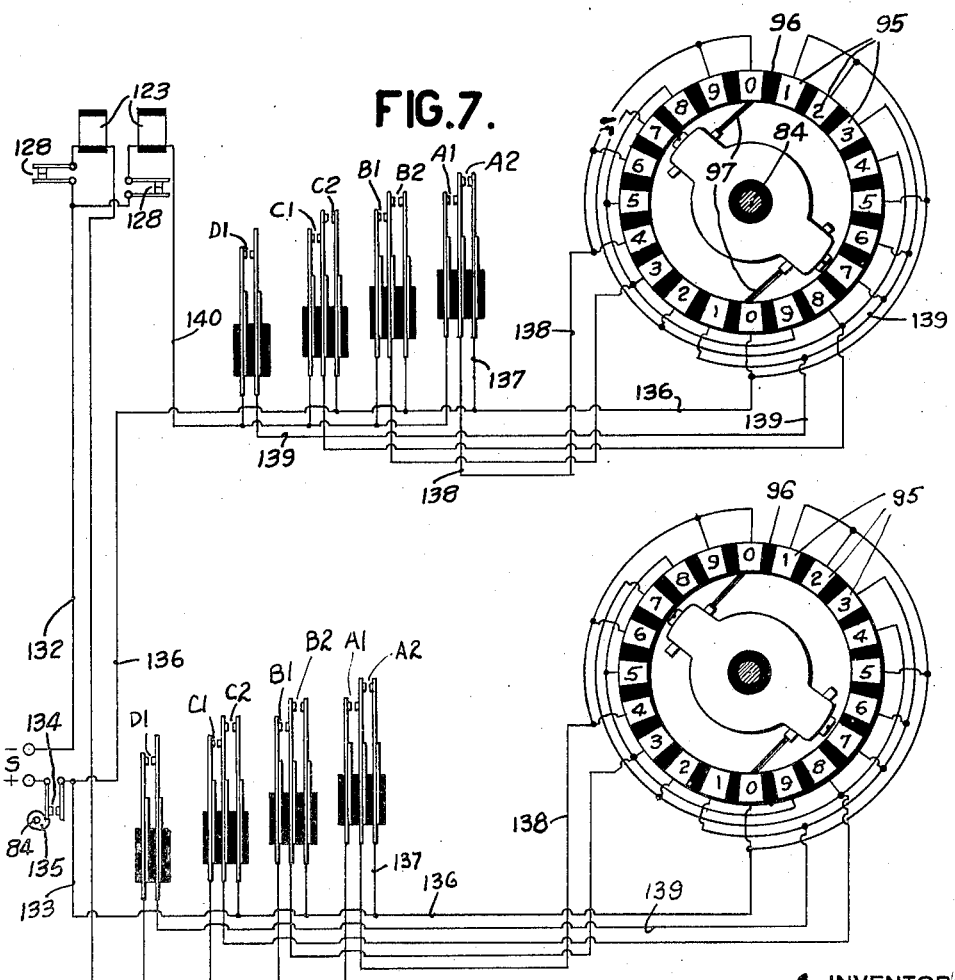

Patented Aug. 4, 1936

2,049,719

UNITED STATES PATENT OFFICE 2,049,719

PERFORATED CARD READING AND ANALYZING DEVICE

John Royden Peirce, New York, and Torkel E. Torkelson, Merrick, N. Y., assignors, by mesne assignments, to International Business Machines Corporation, New York, N. Y., a corporation of New York Application December 16, 1932, Serial No. 647,568

1 Claim. (Cl. 235—92)

This invention relates to analyzing devices for perforated card controlled accounting machines and more particularly to the perforation sensing devices and the mechanism controlled thereby for controlling the accumulators.

One of the objects of the invention is to devise improved means whereby the perforations of the record card may be analyzed by sensing pins and the reading taken by the pins converted by electrical devices which in turn control the accumulator wheels.

Another object is to devise means whereby the perforation sensing pins will effect a setting of contacts in combinational arrangement whereby they control the timing of electric circuits for controlling the operation of the accumulator wheels.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a side view of the device showing the driving mechanism therefor.

Fig. 2 is a side sectional elevation showing the analyzing mechanism.

Fig. 3 is a detail of the accumulators.

Fig. 4 is a detail of an accumulator wheel and the drive therefor.

Fig. 5 is a portion of a perforated record used to control the machine and showing the code or arrangment of the perforations to represent the individual digits.

Fig. 6 is a detail at an enlarged scale of the sensing pins and the contacts controlled thereby.

Fig. 7 is a wiring diagram of the electric circuits controlled by the sensing pins and in turn controlling the accumulator magnets.

In the well known Hollerith tabulators, accumulators similar to that shown in Fig. 3 are employed in which a constantly rotating shaft may be clutched to the accumulator wheels during a portion of a revolution of the shaft to turn the accumulator wheels a distance representing the value which is being added. In the Hollerith type of tabulator the control card is provided with ten hole positions to a column, the values ranging from 0 up to 9. The card is fed so that the ten positions in a column pass successively under the sensing brushes, the 9 passing under the brush first, followed by the 8, and then the 7, etc. The accumulator driving shaft turns synchronously with the passage of the successive hole positions of the card under the brush. If a hole appears in the 9 position, the accumulator clutch is thrown in and the accumulator commences to turn and continues to turn until the end of a card cycle, at which time it is de-clutched. During this cycle the accumulator wheel turns to accumulate the value "9". If a perforation appears at some other point in the column, as for instance at the 5 position, the clutching takes place at a correspondingly later time in the cycle and continues to the end of the cycle, adding 5 to the accumulator wheel before the de-clutching takes place.

In the present invention, the same type of accumulator is used, operating synchronously with a commutator which in turn contacts electric circuits to energize the accumulator control magnets at different times during the cycle of operation, depending upon the amount to be added to the accumulator wheel. The time in the cycle when a circuit will be established through the commutator to the accumulator control magnet depends upon the setting of contacts which are controlled by the sensing pins.

Instead of using ten hole positions in a column to represent a digit, the present uses but four and instead of reading the card while it is moving past brushes it is stopped in the sensing position and pins are projected against it to sense the perforations therein. One or more perforations in the four positions are used to represent any given digit in accordance with the well known Peirce combinational system.

In Fig. 2, the perforated cards 1 are shown stacked in a hopper 2 mounted between the supporting plates 3. A weight 4 presses the cards down in the hopper. A narrow slot 5 at the bottom of the hopper is adapted to permit but one card to pass through at a time. The card picker 6 is adapted to engage the lowermost card of the stack and advance it through the slot 5. The picker is mounted on sliding member 7 carried in the grooves 8 in the frame of the machine. The supporting member 7 is provided with rack teeth meshing with a segmental gear 9 mounted on a shaft 10 and adapted to oscillate to move the picker back and forth. The shaft 10 has fixed thereon, outside of the supporting plates 3, an arm 11 (see Fig. 1) connected by a link 12 to a bell crank 13 pivoted at 14 and provided with a cam follower roll 15 cooperating with a cam 16 fixed on shaft 17. A spring 18 connected to an arm 19 also on shaft 10 serves to hold the follower 15 against its cam and to move the picker forward to feed the card through the slot 5. This action is readily traceable through the connections just described. The shaft 17 has fixed thereon a gear 20 meshing with a gear 21 which in turn meshes with gear 22. Gear 22 meshes with gear 23 which is driven by the driving gear 24.

One complete cycle of the shaft 17 causes the card picker to move once to the right to feed a card through the slot 5 and back to the left as in Fig. 2. When the card is fed through the slot 5, it is gripped between feed rollers 25, 26 and fed by these rollers to the next set of rollers 27, 28 which in turn feed it between the plates 29, 30. The card is fed downwardly until it is stopped by a gate 31 mounted on an arm 32 pivoted at 33.

Fixed on shaft 33 as shown in Fig. 1 is an arm 34 connected by link 35 to a cam follower arm 36 having a cam follower 37 cooperating with a cam 38 on the shaft 17. A spring 39 holds the follower against its cam. The cam 38 is adapted to cause the gate 31 to move to the position of Fig. 6 to stop the card 1 between plates 29, 30 and to rock counterclockwise to permit the card to pass out from between the plates 29, 30 later in the cycle. At this time, the feed rollers 40, 41 will feed the card out from between the plates 29, 30. A curved guide plate 42 will guide the leading edge of the card into cooperation with the clips 43 on the card stacker 44 pivoted at 45. This stacker is well known in the art and need not therefore be described in detail. The stacker is actuated by a bevel pinion 46 on shaft 45 and meshing with a bevel pinion 47 fixed on shaft 48. Another bevel pinion 49 on shaft 48 meshes with bevel pinion 50 fixed on shaft 51 with gear 21. The timing of the stacker is such that the clips 43 are open to receive the card as it feeds downwardly over the guide plate 42. The clips then grip the card and pull it into the discharge stack or pocket 52.

The turning of the feed rollers is effected by a gear 53 mounted on shaft 17 and meshing with a pinion 54 fixed with respect to the feed roller 27. The pinion 54 meshes with pinion 55 fixed with respect to the roller 28 which is carried by an arm 56 pivoted at 57 and held resiliently against the card by a spring 58. An idler 59 meshes with pinion 54 and pinion 60 fixed with respect to the feed roller 25. Pinion 60 meshes with pinion 61 fixed with respect to the feed roller 26 which is carried on the arm 62 pivoted at 57 and held resiliently by spring 63 against the card.

The lower feed roller 40 is provided with a pinion 64 meshing with gear 53. The roller 41 is not positively driven but is driven by being pressed against the card and in turn pressing the card against the roller 40 which is positively driven. Roller 41 is carried on an arm 65 loose on the shaft 33 and provided with a pin 66 which is engaged by an arm 67 fixed on shaft 33. Spring 68 attached to the arm 65 tends to rock the roller 41 against the card or the roller 40 lightly. When the shaft 33 rocks to move the gate 31 to permit the card to be fed out, the arm 67 engages the arm 65 and presses the roller 41 firmly against the card to insure feeding thereof.

After the card 1 has been fed to the position of Fig. 6 and stopped by the gate, the sensing pins 69, of which there are four for each column of data on the card, are permitted to advance against the card. The sensing pins are supported at their forward ends in the plate 30 and at an intermediate point by a plate 71. Each pin 69 is provided with a spring 72 resting at one end against a collar 73 fixed to the pin and at the other end against a collar 74 loose on the pin and resting against the plate 71. The spring 72 thus tends to press the pin against the card or through the card if there is a perforation therein at that position. A restoring plate 75 resting against the collar 73 is adapted to restore the sensing pins to non-reading positions as in Fig. 2 and to be moved to the left to permit the pins to take a reading from the card. The restoring plate 75 is connected to arms 76 which, in turn, are connected to arms 77 fixed on shaft 78 which, as shown in Fig. 1 has fixed thereon an arm 79 connected by a link 80 to an arm 81 pivoted at 81a and fixed with respect to a cam follower arm 81b provided with a cam follower roller 82 cooperating with a cam 83 fixed on shaft 84. Shaft 84 has fixed thereon a gear 85 meshing with a gear 86 on the shaft 87 on which is also mounted the gear 23. A spring 88 connected to arm 81b holds the follower 82 against the cam 83. The cam positively restores the plate 75 to the position of Fig. 2, removing the pins from reading position of Fig. 6 to the position of Fig. 2 while the spring 88 moves the plate 75 to the left to permit the pins to be actuated by their springs to take their readings. Each pin 69 has integral therewith a rectangular rod 89 which carries a lateral projection 90.

Cooperating with projections 90 is a vertically reciprocable plate 91 having cam surfaces 92 and steps 93 which permit the rods 89 to advance toward the left either one step or two steps when the related pin 69 enters a perforation in the card. When a single pin 69 advances alone to sense the perforation representative of either a "1", a "2", a "5", or a "0", it will advance two steps, its projection 90 advancing to the full depth of the slots in plate 91. The three lowermost projections 90 will, in so doing, engage cam surfaces 92 and raise plate 91 so that steps 93 will be in the path of projections 90 of the three upper rods. It follows then that when a two hole combination is sensed, one of the pins will advance two steps and the other will move but one step, and it will be seen upon inspection that it is the lowermost pin of the combination that advances two steps, camming plate 91 upwardly to limit the advance of the second pin to one step. Fig. 6 shows pins 69 positioned to read a "6" for which combination the lowermost pin has advanced two steps camming plate 91 upwardly so that the uppermost step 93 limits the advance of the uppermost projection 90 to one step.

Cooperating with the free ends of rods 89 are pairs of contacts D1, C1, C2, B1, B2, A1, and A2 which are all normally open and associated with the rods as shown in Figs. 2 and 6. When one of the three uppermost rods 89 advances one step, one of the contacts C2, B2, or A2 will close and when one of the rods advances two steps, one of the contacts D1, C1, B1, or A1 will close. The following table will indicate the combinational setting of the several pairs of contacts for each digit:

Sensing of digit 1 will cause closure of D1
Sensing of digit 2 will cause closure of C1
Sensing of digit 3 will cause closure of D1 and B2
Sensing of digit 4 will cause closure of C1 and A2
Sensing of digit 5 will cause closure of B1
Sensing of digit 6 will cause closure of D1 and A2
Sensing of digit 7 will cause closure of D1 and C2
Sensing of digit 8 will cause closure of C1 and B2
Sensing of digit 9 will cause closure of B1 and A2
Sensing of digit 0 will cause closure of A1

A set of contacts is provided for each column of data analyzed and the blades of the contacts are wired to the segments 95 of a commutator 96 as shown in Fig. 7, there being a commutator for each set of contacts. Commutator 96 is stationary and mounted concentrically about shaft 84 which carries brushes 97 for cooperation with the segments 95. Shaft 84, and consequently brush 97, is synchronized with the accumulator in such manner that during the entering period of the accumulating cycle, brushes 97 contact with and connect the pairs of segments 95 from 9 to 0 successively, making a half revolution in so doing.

The accumulator wheels or pinions are shown at 115 (Figs. 3 and 4) and are loose on shaft 116. The accumulator pinions mesh with gears 117 loose on shaft 118 which is constantly rotating. Fixed to the gear 117 is a clutch member 119 and slidably mounted on shaft 118 but constrained to turn therewith are clutch members 120 provided with circumferential grooves engaged by clutch control arms 121 pivoted at 122. Associated with each arm 121 is a control magnet 123 having an armature 124 pivoted at 125 and actuated by a spring 126 into position over shoulder 124a of a block 124b fixed to the arm 121. Armatures 124 which serve as latches thus hold the arms 121 in position to maintain the clutch members 120 out of mesh with the clutch members 119. When the magnet 123 becomes energized, rocking its armature 124, the respective arm 121 is unlatched and the spring 127 of contacts 128 rocks the arm 121 counterclockwise about its pivot 122 and moves the clutch member 120 into cooperation with member 119 so that the gear 117 will be caused to rotate, thus turning the accumulator wheel 115.

The clutches are, of course, brought into operation at varying times during the adding portion of the cycle but all are de-meshed together at the end of the cycle by mechanism shown in U. S. Patent No. 1,307,740. The accumulator parts are turned by a gear 130 meshing with a gear 131 fixed on shaft 84.

The manner in which a specific digit, let us say "6", is entered into the accumulator at the proper time will now be explained in connection with the circuit diagram of Fig. 7. Current is supplied from a source S to the lines 132 and 133. A pair of contacts 134 is disposed in line 133 and controlled by a cam 135 on shaft 84 to close the contacts during the entering period of the accumulator. This period corresponds to a half revolution of shaft 84 wherein brushes 97 traverse the 9 to 0 segments in succession. As explained above, the sensing of a "6" combination by pins 69 will cause closure of contacts D1 and A2. When the brushes 97 bridge the "6" segments 95 a circuit is completed as follows: from source S, contacts 134, wire 136, wire 137, contacts A2 (now closed), wire 138, "6" segment 95, brushes 97, other "6" segment 95, wire 139, contacts D1 (now closed), wire 140, accumulator clutch magnet 123, contacts 128, wire 132, back to source S.

As soon as the magnet 123 is energized, the arm 121 becomes released to effect clutching of the respective accumulator pinions. At this time the spring 127 which actuates the arm 121 opens contacts 128 and the magnet 123 becomes de-energized. The particular accumulator wheel will now commence to rotate and will continue to rotate until the end of the cycle when it becomes de-meshed from the driving shaft 118. The accumulator wheel will during this time turn an amount equal to the value of 6. The construction of the accumulators to effect carrying from one order to the next higher order being well known in this art is not shown in detail here.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is as follows:

In a machine of the class described, means for feeding records to the machine, a plurality of sensing pins for sensing a record, a single pair of contacts associated with one of said pins, a plurality of pairs of contacts associated with each of the other pins, each pin being designed to normally close a single pair of contacts when the pin senses a perforation in the record, means controlled by the first mentioned one of said pins for causing another of said pins to close a different one of the pairs of contacts associated with the latter pin when both pins sense perforations in the record, a magnet, a commutator having associated brushes, and means controlled by said commutator and contacts for differentially closing a circuit through said magnet.

JOHN ROYDEN PEIRCE.
TORKEL E. TORKELSON.